United States Patent Office

2,744,942
Patented May 8, 1956

2,744,942

PRODUCTION OF NITRATION GRADE AROMATICS BY CATALYTIC HYDROFORMING, SOLVENT EXTRACTION AND CLAY TREATMENT

Charles Wankat, Brookfield, Ill., assignor to Universal Oil Products Company, Chicago, Ill., a corporation of Delaware No Drawing. Application March 8, 1952,
Serial No. 275,655

2 Claims. (Cl. 260—674)

This invention relates to the production of nitration grade aromatics and more particularly to a method of treating an aromatic concentrate, which does not meet the nitration grade specifications, in order that the concentrate will meet these specifications.

The nitration grade aromatic specifications are very severe and exacting. One of these severe limitations is the acid wash color test. This test generally comprises contacting specified amounts of concentrated sulfuric acid with specified amounts of the aromatic concentrate and comparing the colors of the acid layer and the hydrocarbon layer with a series of 15 color standards ranging from water white, which is zero acid wash color, to an amber color, which is rated as 14 acid wash color. These acid wash color specifications require that the acid layer must have an acid wash color not darker than Number 2, and that the hydrocarbon layer must undergo no discoloration. The acid wash water color specifications have been most difficult to meet and, in the past, it has been the practice to utilize sulfuric acid treatment of the aromatic concentrate in order to meet these specifications. However, the sulfuric acid treatment has several disadvantages. In the first place, it results in excessive losses of expensive aromatics. Secondly, it is necessary to caustic wash the acid treated material to neutralize the acidity resulting from the sulfuric acid treatment in order to meet the nitration grade acidity specifications. However, this in turn results in difficult emulsion problems. Furthermore, the use of acid treatment presents another problem in the matter of disposing of the spent sulfuric acid. As hereinbefore set forth, it has been necessary in the past to resort to this expensive and objectionable method of treatment in order that the aromatic concentrate meets the severe acid wash color tests.

In contrast, I now have found that the severe acid wash color test may be met satisfactorily by treating an aromatic concentrate with clay under selected conditions of operation. This result is surprising because heretofore it had been believed that only a severe acid treat would produce nitration grade aromatics. Therefore, it is contrary to expectations that a less severe treatment of the aromatic concentrate would result in a product meeting the acid wash color tests.

The novel process of the present invention avoids the objections hereinbefore encountered with the severe acid treatment. The losses encountered during treatment in accordance with the present process are infinitesimal, and no emulsion problems are encountered. Furthermore, it does not present the difficult problem of disposing of spent acid.

In one embodiment the present invention relates to a process for producing a nitration grade aromatic which comprises subjecting an aromatic concentrate to treatment with an aluminum silicate at a temperature of from about 275° F. to below that at which cracking occurs.

In another embodiment the present invention relates to a process for producing a nitration grade aromatic which comprises subjecting an aromatic concentrate to treatment with clay at a temperature of from about 275° to about 800° F.

In a specific embodiment the present invention relates to a process for producing nitration grade benzene which comprises subjecting a benzene concentrate to treatment with clay at a temperature of from about 350° to about 550° F.

In accordance with the present invention, an aromatic concentrate is treated with an aluminum silicate under selected temperature conditions. The aromatic concentrate may be obtained from any suitable source, including coal tar products, petroleum conversion processes, etc. The aromatic concentrate for treatment in accordance with the present invention usually will comprise a concentrate produced by distillation, solvent extraction, solvent crystallization, etc. and generally by a mixture of these and other operations. The aromatic concentrate preferably comprises a mixture of aromatic hydrocarbons, and the mixture is treated in accordance with the present invention, followed by separation into individual aromatic fractions. In another embodiment, the aromatic concentrate is separated into a concentrate of an individual aromatic hydrocarbon as, for example, a benzene concentrate, a toluene concentrate, a xylene concentrate, etc., and the individual aromatic concentrate is subjected to treatment in accordance with the present invention.

In one embodiment, the aromatic concentrate is advantageously obtained from the products of a reforming operation and more particularly an aromatization operation. Generally the products will be treated by distillation, solvent extraction, and/or other methods to separate an aromatic concentrate, which concentrate then is treated in accordance with the present invention to produce aromatics meeting nitration grade specifications. A particularly preferred product for treatment in accordance with the present invention is an aromatic concentrate obtained from the products of the Platforming Process, in which process a gasoline or selected fraction thereof, referred to as a gasoline fraction in the present specifications and claims, is subjected to conversion in the presence of a catalyst containing platinum, alumina and combined halogen, followed by solvent extraction of a selected fraction to separate the aromatic concentrate. As hereinbefore set forth, it is understood that any suitable source of aromatic concentrate may be treated in accordance with the present invention.

In accordance with the present invention the aromatic concentrate is subjected to treatment with an aluminum silicate under selected temperature conditions. The aluminum silicate preferably comprises a naturally occurring aluminum silicate and more particularly naturally occurring clays, which may be treated by acid or otherwise when desired. A particularly suitable treated clay is the commercially available Attapulgus clay. It is understood that synthetically prepared silica-alumina composites which may or may not contain other oxides, including those of magnesia, zirconia, vanadia, etc., or mixtures thereof, may be employed. However, it is understood that the various aluminum silicates which may be used in accordance with the present process are not necessarily equivalent.

As hereinbefore set forth, treatment of the aromatic concentrate must be effected under selected temperature conditions. In accordance with the present invention, this treatment must be effected at a temperature of from about 275° F. to below that at which substantial cracking occurs. While the upper temperature limitation will vary with different aromatic concentrates, generally it may be considered to be about 800° F., although it is understood that higher temperatures may be employed with certain aromatic concentrates but, as hereinbefore set forth, the temperature should not be above that at which substantial cracking of the aromatics occurs. The process may be effected at any suitable pressure which may range from atmospheric to 1000 pounds or more. In a preferred embodiment, the pressure should be sufficient to maintain the aromatic concentrate in substantially liquid phase as this offers the advantage, in down flow operation, of providing a wash to remove heavier components which otherwise would remain in the clay. In this manner the life of the clay is extended. After treatment in this manner, the products preferably are fractionated in order to remove the higher boiling material and to meet the boiling range limitations of the nitration grade specifications. As hereinbefore set forth, the aromatic concentrate charged to the treating step preferably has not previously been subjected to close fractionation to separate an individual aromatic fraction, and such fractionation may be effected after treatment in accordance with the present invention. At the same time, separation of the higher boiling material advantageously is effected.

Treatment in accordance with the present invention may be effected in any suitable manner. In a preferred manner, a bed of the aluminum silicate is disposed in a reaction zone, and the aromatic concentrate, at the desired temperature, is passed therethrough either in upward or downward flow. As hereinbefore set forth, downward flow is preferred because it serves to wash heavy material off the treating agent. In another embodiment, the treating zone may be heated in any suitable manner to obtain and/or maintain the desired temperature. Other methods of treatment may include the slurry type system in which the aluminum silicate is carried through a reaction zone as a slurry in the aromatic concentrate, the moving bed type process in which the aluminum silicate passes either concurrently or countercurrently to the aromatic concentrate, etc.

While the process as hereinbefore set forth will produce an aromatic concentrate which will meet nitration grade specifications in the case of most aromatic concentrates, there may be some aromatic concentrates which will not quite meet the nitration grade specifications when so treated. In the case of these more difficult stocks, another embodiment of the present invention comprises treating as hereinbefore set forth, followed by a mild acid treat. The mild acid treat in general will comprise treating with an acid in an amount of not more than about 5 to 10 pounds of acid per barrel of aromatic concentrate. In view of the fact that the acid treat in the final step is mild, the losses resulting from the combination process will be considerably less than those encountered in the severe acid treatment of the prior art.

The following examples are introduced to illustrate further the novelty and utility of the present invention but not with the intention of unduly limiting the same.

*Example I*

A synthetic aromatic concentrate was prepared to contain amounts of benzene, toluene and xylene similar to those expected in a commercially available aromatic concentrate. This concentrate contained approximately 8.1% by volume of benzene, 43% by volume of toluene and 37.2% by volume of xylenes and ethylbenzene. This aromatic concentrate was subjected to treatment with commercially available Attapulgus clay at a temperature of 400° F. and a pressure of 200 pounds per square inch.

The products were subjected to fractionation to separate a benzene cut and a toluene cut.

The benzene cut had a boiling range of from 79.7° to 80.3° C. and an acid wash color of less than 1. As hereinbefore set forth, the maximum acid wash color to meet nitration grade specifications is 2. Thus, the treated aromatic grade meets the acid wash color specifications. Furthermore, the boiling range meets the nitration grade specifications that the product boils within 1° C. including 80.1° C.

The toluene fraction had an acid wash color of less than 1 which, here again, meets the nitration grade specification of a maximum of 2. The boiling range of the treated toluene concentrate was 110.2° to 111° C. which meets the nitration grade specifications that the product boils within 1° C. including 110.6° C.

In addition to the specific limitations mentioned above, the benzene and toluene concentrates treated in accordance with the present invention meet the other requirements of the nitration grade benzene and toluene specifications.

*Example II*

The aromatic concentrate used in this example was obtained by platforming a Gulf Coast naphtha fraction, followed by distillation and solvent extraction using a glycol solvent. The aromatic concentrate had a boiling range of 174° to 293° F. The aromatic concentrate was treated with Attapulgus clay at a temperature of 400° F. and a pressure of 200 pounds per square inch. The clay treated products were caustic washed, water washed, filtered, and fractionated to separate nitration grade benzene, nitration grade toluene and nitration grade xylene.

The nitration grade benzene, nitration grade toluene and nitration grade xylene all had acid wash colors of zero for both the hydrocarbon layer and the acid layer. It is thus apparent that the treated fractions meet the acid wash color tests of the nitration grade specifications.

*Example III*

Another portion of the aromatic concentrate was subjected to treatment with sulfuric acid using 20 pounds of 93.2% acid per barrel of aromatic concentrate. The losses encountered in this operation amounted to 3.3% by volume of the aromatic concentrate. Furthermore, during the subsequent caustic and water washing, emulsions were encountered and these emulsions were difficult to break, thus further emphasizing the objections to this method of treating.

*Example IV*

Another portion of the aromatic concentrate described in Example I was subjected to treatment with Attapulgus clay at a temperature of 250° F. and a pressure of 20 pounds per square inch. The products were fractionated to form a benzene fraction. It was found that the hydrocarbon layer had an acid wash color of about 5 and that the toluene fraction had an acid wash color of about 3. From the above results it will be noted that the use of a temperature of 250° F. was unsatisfactory in producing an aromatic concentrate which meets nitration grade specifications.

I claim as my invention:

1. A process for producing a nitration grade aromatic which comprises subjecting a gasoline fraction to reforming in the presence of a catalyst comprising platinum, separating an aromatic fraction from the products of said reforming, subjecting said aromatic fraction to treatment with a selective solvent to separate an aromatic concentrate, and subjecting said aromatic concentrate to treatment with an aluminum silicate at a temperature of from about 275° F. to below that at which cracking occurs.

2. A process for producing a nitration grade aromatic which comprises subjecting a gasoline fraction to reforming in the presence of a catalyst comprising platinum, alumina and combined halogen, separating an aromatic fraction from the products of said reforming, subjecting said aromatic fraction to extraction with a glycol solvent to separate an aromatic concentrate, and subjecting said aromatic concentrate to treatment with clay at a temperature of from about 275° to about 800° F.

References Cited in the file of this patent

UNITED STATES PATENTS

| | | |
|---|---|---|
| 2,232,761 | Balthis | Feb. 25, 1941 |
| 2,358,129 | Lake | Sept. 12, 1944 |
| 2,462,391 | Hartough et al | Feb. 22, 1949 |
| 2,479,110 | Haensel | Aug. 16, 1949 |
| 2,511,251 | Feasley | June 13, 1950 |
| 2,569,216 | Arundale | Sept. 25, 1951 |
| 2,582,197 | Egan | Jan. 8, 1952 |